United States Patent
Kammerzell et al.

(10) Patent No.: US 9,981,467 B2
(45) Date of Patent: May 29, 2018

(54) CATEGORIZATION OF VERTICAL EDGES CORRESPONDING TO A HALFTONE IMAGE

(71) Applicant: HEWLETT-PACKARD DEVELOPMENT COMPANY, L.P., Houston, TX (US)

(72) Inventors: Barret Kammerzell, Barcelona (ES); Antonio Gracia Verdugo, Barcelona (ES)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days. days.

(21) Appl. No.: 15/307,466

(22) PCT Filed: Jul. 25, 2014

(86) PCT No.: PCT/US2014/048188
§ 371 (c)(1),
(2) Date: Oct. 28, 2016

(87) PCT Pub. No.: WO2016/014074
PCT Pub. Date: Jan. 28, 2016

(65) Prior Publication Data
US 2017/0050433 A1    Feb. 23, 2017

(51) Int. Cl.
*B41J 2/04* (2006.01)
*B41J 2/045* (2006.01)
(Continued)

(52) U.S. Cl.
CPC ......... *B41J 2/04558* (2013.01); *B41J 19/142* (2013.01); *B41J 19/145* (2013.01);
(Continued)

(58) Field of Classification Search
CPC ........ B41J 2/01; B41J 2/04558; B41J 19/142; B41J 19/145; G06K 15/1822; G06K 15/102; H04N 1/4051; H04N 1/4092
See application file for complete search history.

(56) References Cited

U.S. PATENT DOCUMENTS

| | | | |
|---|---|---|---|
| 5,369,428 A | 11/1994 | Maze et al. | |
| 6,666,535 B2 | 12/2003 | Xie et al. | |

(Continued)

FOREIGN PATENT DOCUMENTS

| | | |
|---|---|---|
| CN | 1390703 | 1/2003 |
| JP | 08-080612 | 3/1996 |

(Continued)

OTHER PUBLICATIONS

Link et al.; Ink Drop Motion in WIde-format Printers; Chemical Engineering and Processing: Process Intensification 48, Feb. 11, 2008; pp. 68-83.

*Primary Examiner* — Huan Tran
(74) *Attorney, Agent, or Firm* — HP Inc. Patent Department

(57) ABSTRACT

A method of printing includes identifying vertical edges in a halftone image. The method also includes determining whether a lightness of color of a first predetermined area to a left side of a respective vertical edge is substantially equal to, less than, or greater than the lightness of color of a second predetermined area to a right side of the respective vertical edge. The method also includes categorizing respective vertical edges left vertical edges, right vertical edges, and neutral vertical edges to prioritize a print direction thereof.

11 Claims, 5 Drawing Sheets

(51) Int. Cl.
  *B41J 19/14*     (2006.01)
  *H04N 1/405*    (2006.01)
  *H04N 1/409*    (2006.01)
  *G06K 15/10*    (2006.01)
  *G06K 15/02*    (2006.01)

(52) U.S. Cl.
  CPC ....... *G06K 15/102* (2013.01); *G06K 15/1822* (2013.01); *H04N 1/4051* (2013.01); *H04N 1/4092* (2013.01)

(56) References Cited

U.S. PATENT DOCUMENTS

| | | |
|---|---|---|
| 7,607,751 B2 | 10/2009 | Geurts |
| 2002/0075341 A1 | 6/2002 | Suwa et al. |
| 2002/0149635 A1* | 10/2002 | Askeland ............... B41J 2/2132 347/9 |
| 2002/0186273 A1 | 12/2002 | Nakagawa et al. |
| 2003/0132975 A1 | 7/2003 | Xie et al. |
| 2006/0033772 A1 | 2/2006 | Yakubov et al. |
| 2006/0109291 A1 | 5/2006 | De Pena et al. |
| 2006/0232632 A1 | 10/2006 | Kosugi |
| 2007/0109343 A1 | 5/2007 | Geurts |

FOREIGN PATENT DOCUMENTS

| | | | |
|---|---|---|---|
| JP | 2001-171098 | 6/2001 | |
| JP | 2006-27181 | 2/2006 | |
| JP | 2011-20380 | 2/2011 | |
| WO | WO 2016/014074 | * 1/2016 | .......... B41J 2/04558 |

* cited by examiner

CATEGORIZATION OF VERTICAL EDGES CORRESPONDING TO A HALFTONE IMAGE

BACKGROUND

Printing systems such as inkjet printers eject ink drops onto media to form images. The printing systems may include printhead carriages which support printheads and move across the media in a bidirectional manner. Thus, printing can be performed in a forward scanning direction and a reverse scanning direction.

BRIEF DESCRIPTION OF THE DRAWINGS

Non-limiting examples are described in the following description, read with reference to the figures attached hereto and do not limit the scope of the claims. Dimensions of components and features illustrated in the figures are chosen primarily for convenience and clarity of presentation and are not necessarily to scale. Referring to the attached figures:

DETAILED DESCRIPTION

Figure 1:
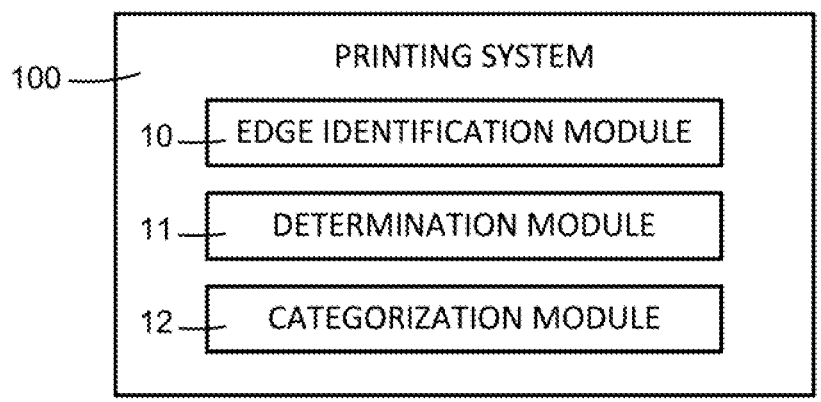
FIG. 1 is a block diagram illustrating a printing system according to an example.

Printing systems such as inkjet printers eject ink drops onto media to form images thereon. At times, however, in addition to the ink drops, unintended satellite droplets may also be formed and land on the media. The satellite droplets tend to be slower in arriving at the media than the ink drops. Consequently, the satellite droplets may land on the media in a position offset from the respective ink drop in a printhead carriage scanning direction. The printhead carriage supports a printhead and moves the printhead in a bi-directional manner across the media. Thus, printing can be performed in the bi-directional manner. Accordingly, if the ink drop is positioned on a vertical edge of the image (e.g., printed feature), the satellite droplets tend to land and be visible outside of the image. For example, when the image is darker than the surrounding area, satellite droplets that land outside of the image may be visible. Consequently, the printed edge of the image may be blurred and/or less clearly defined.

For example, when printing is performed in both scan directions, half of the ink drops may have corresponding satellite droplets that land on one side of the image and the other half of the ink drops may have satellite droplets that land on the other side of the image. That is, printing performed in such a manner may divide the ink drops up between the forward scanning direction and the reverse scanning direction. In this way, half of the ink drops may form a trailing printed edge perpendicular to the scanning direction with satellite droplets visible and landing outside of the image. Thus, such respective printed edges of the image may be blurred and/or not clearly defined.

In examples, a method of printing includes identifying vertical edges corresponding to a halftone image. The method also includes determining whether a lightness of color of a first predetermined area to a left side of a respective vertical edge is substantially equal to, less than, or greater than the lightness of color of a second predetermined area to a right side of the respective vertical edge. For example, the lightness of color of a respective area may correspond to the various colors of pixels or ink drops that are within the respective area. The method also includes categorizing respective vertical edges as left vertical edges, right vertical edges, and neutral vertical edges.

Left vertical edges correspond to the respective vertical edges in which a determination that the lightness of color of the first predetermined area is less than the lightness of color of the second predetermined area. Right vertical edges correspond to the respective vertical edges in which a determination that the lightness of color of the first predetermined area is greater than the lightness of color of the second predetermined area. Neutral vertical edges correspond to the respective vertical edges in which a determination that the lightness of color of the first predetermined area is substantially equal to the lightness of color of the second predetermined area. This, ink drops are printed on the media in one of the forward scanning direction or the reverse scanning direction to enable printed edges to be printed as leading edges, rather than trailing edges. In leading edges, corresponding satellite droplets land on ink drops of similar color and, thus, may be less visible. Alternatively, in trailing edges, corresponding satellites droplets land on lighter colors including unprinted substrate and, thus, may be more visible. Accordingly, images printed with blurred and/or not clearly defined edges may be reduced.

FIG. 1 is a block diagram illustrating a printing system according to an example. Referring to FIG. 1, a printing system 100 includes an edge identification module 10, a determination module 11, and a categorization module 12. The edge identification module 10 identifies vertical edges corresponding to a halftone image. A virtual representation corresponding to the halftone image may be stored in a memory. A halftone image, for example, may be made up of a series of dots rather than a continuous tone. These dots can be different sizes, different colors, and/or different shapes. In some examples, larger dots may be used to represent darker and denser areas of the image, while smaller dots may be used to represent lighter areas. Some of the dots, for example, may form vertical edges.

Referring to FIG. 1, the determination module 11 also determines whether the lightness of color of a first predetermined area to a left side of a respective vertical edge is substantially equal to, less than, or greater than the lightness of colors of a second predetermined area to a right side of the respective vertical edge. The lightness of color of a respective area may correspond to the various colors of pixels or ink drops that are within the respective area. In some examples, whether a lightness of color of a first predetermined area is substantially equal to, less than, or greater than the lightness of color of a second predetermined area may depend on whether a difference between the lightness of color of the first predetermined area and the lightness of color of the second predetermined area is greater than or less than a threshold lightness difference. For example, the threshold lightness difference may be 100, for example, in a scale from 0 to 255 such that a white of the media may correspond to 0 and a black may correspond to 255 along the L* axis of the L*a*b* color space. In other examples, a different lightness threshold may be used as well as other ways of differentiating between tones.

Referring to FIG. 1, the categorization module 12 categorizes respective vertical edges as left vertical edges in response to a determination that the lightness of color of the first predetermined area is less than the lightness of color of the second predetermined area. The categorization module 12 also categorizes respective vertical edges as right vertical edges in response to a determination that the lightness of color of the first predetermined area is greater than the lightness of color of the second predetermined area. The categorization module 12 also categorizes respective vertical edges as neutral vertical edges in response to a determination that the lightness of color of the first predetermined area is substantially equal to the lightness of color of the second predetermined area.

In some examples, the edge identification module 10, the determination module 11, and/or the categorization module 12 may be combined into fewer modules such as one module or may be implemented as several modules. The edge identification module 10, the determination module 11, and/or the categorization module 12 may be implemented in hardware, software including firmware, or combinations thereof. The firmware, for example, may be stored in memory and executed by a suitable instruction-execution system.

If implemented in hardware, as in an alternative example, the edge identification module 10, the determination module 11, and/or the categorization module 12 may be implemented with any or a combination of technologies which are well known in the art (for example, discrete-logic circuits, application-specific integrated circuits (ASICs), programmable-gate arrays (PGAs), field-programmable gate arrays (FPGAs)), and/or other later developed technologies. In other examples, the edge identification module 10, the determination module 11, and/or the categorization module 12 may be implemented in a combination of software and data executed and stored under the control of a computing device.

Figure 2:
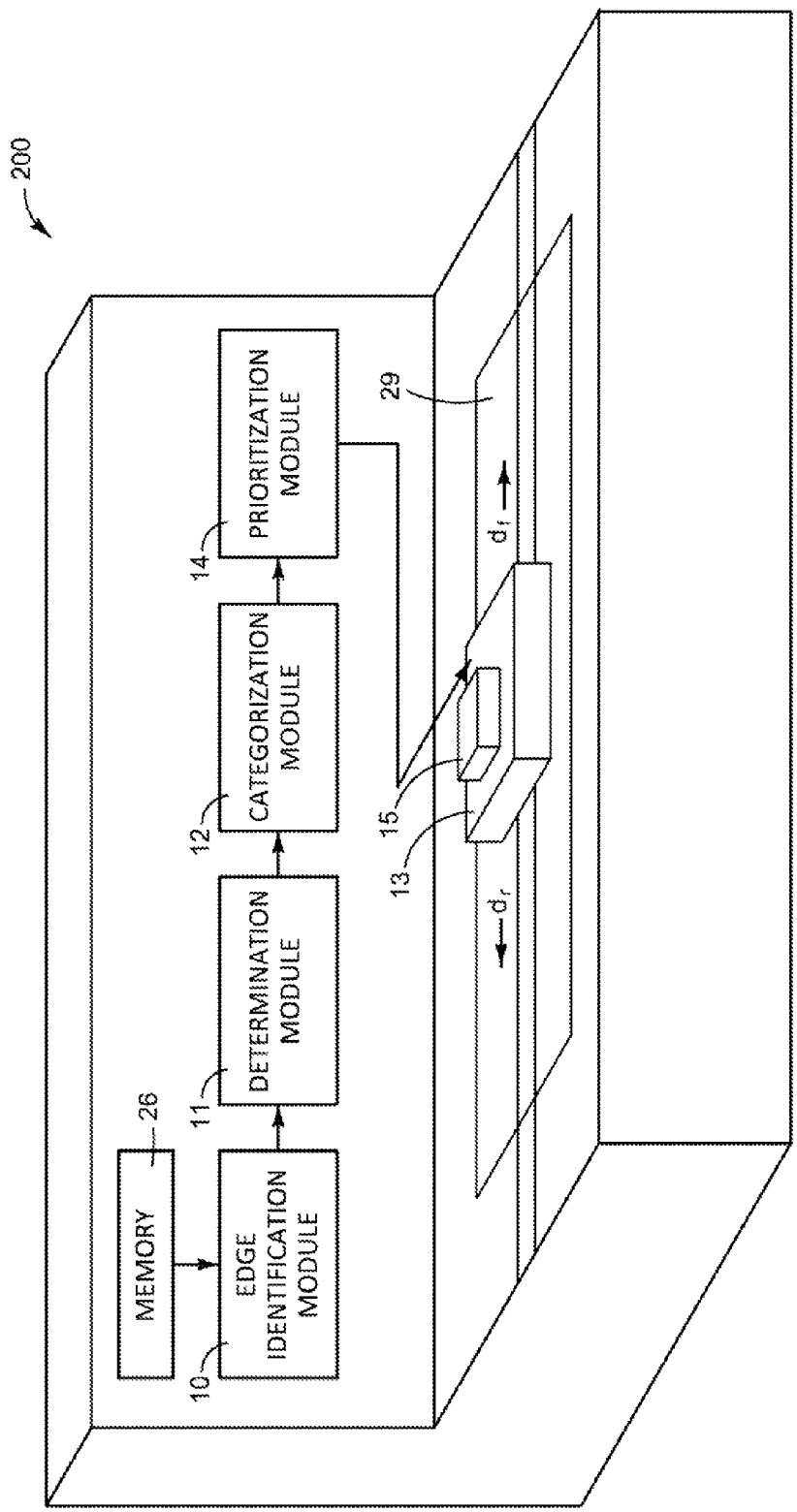
FIG. 2 is a schematic view illustrating a printing system according to an example.
Figure 3:
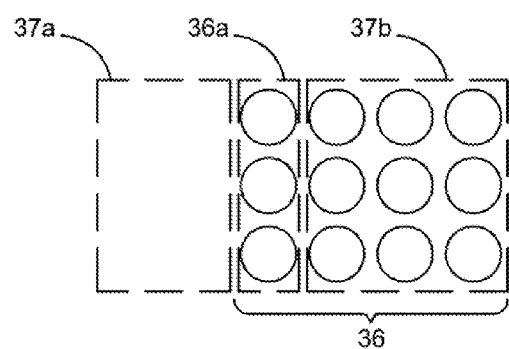
FIG. 3 is a schematic view illustrating a representation of a halftone image corresponding to image data to be processed to identify left vertical edges, right vertical edges, and neutral vertical edges by the printing system of FIG. 2 according to an example.
Figures 4A, 4B, 4C:
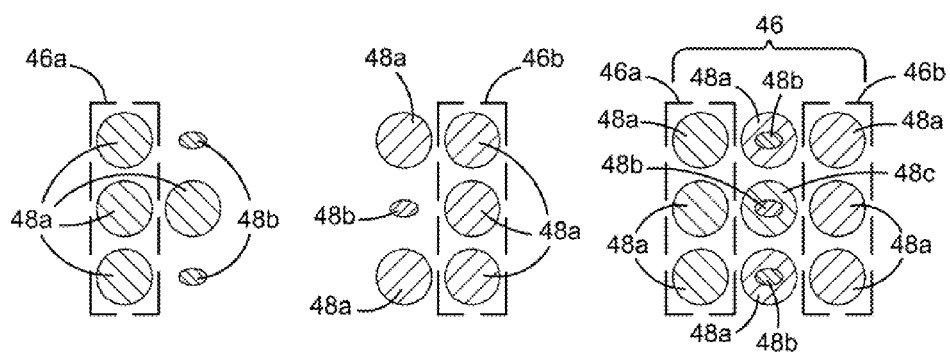
FIGS. 4A-4C are schematic views illustrating a printing of an image on media by the printing system of FIG. 2 according to examples.

FIG. 2 is a schematic view illustrating a printing system according to an example. FIG. 3 is a schematic view illustrating a representation of a halftone image corresponding to image data to identify left vertical edges, right vertical edges, and neutral vertical edges by the printing system of FIG. 2 according to an example. FIGS. 4A-4C are schematic views illustrating a printing of an image on media by the printing system of FIG. 2 according to examples. In some examples, the printing system 200 may include the edge identification module 10, the determination module 11, and the categorization module 12 previously discussed with respect to the printing system 100 of FIG. 1. Referring to FIG. 2, in some examples, the printing system 200 may also include a printhead carriage 13 and a prioritization module 14. The printhead carriage 13 may support a printhead 15 and scan in a bi-directional manner across a media 29 such as in a forward scanning direction $d_f$ and a reverse scanning direction $d_r$. In some examples, the printhead carriage 13 may removably receive at least one printhead 15.

Referring to FIGS. 2-3, the edge identification module 10 identifies vertical edges 36a corresponding to a halftone image 36. A virtual representation corresponding to the halftone image 36 stored in a memory 26 and may be processed to identify the vertical edges 36a prior to forming a printed image 46 (FIG. 4C). Vertical edge identification may include pixel to pixel comparison in a contone image to identify steps from dark to light that are similar for neighboring pixels, pixel comparison in the individual planes of the printer space CMYKxxx halftone, and the like. The edge identification module 10 may communicate with the memory 26 to process the halftone image 36 stored therein.

Referring to FIGS. 2-3, in some examples, the determination module 11 may determine whether the lightness of color of a first predetermined area 37a to a left side of a respective vertical edge 36a is substantially equal to, less than, or greater than the lightness of color of a second predetermined area 37b to the right side of the respective vertical edge 36a. In some examples, the second predetermined area 37b may include the respective vertical edge 36a. For example, the determination module 11 may communicate with the edge identification module 10 and the categorization module 12. In some examples, whether a lightness of color of a first predetermined area is substantially equal to, less than, or greater than the lightness of color of a second predetermined area may depend on whether a difference between the lightness of color of the first predetermined area and the lightness of color of the second predetermined area is greater than or less than a threshold lightness difference. For example, the threshold lightness difference may be 100, for example, in a scale from 0 to 255 such that a white of the media may correspond to 0 and a black may correspond to 255 along the L* axis of the L*a*b* color space. In other examples, a different threshold lightness difference may be used as well as other ways of differentiating between tones.

Referring to FIGS. 2-3, in some examples, the first predetermined area 37a may correspond to an entire area or a portion thereof of the remaining media to the left side of the respective vertical edge 36a, while the second predetermined area 37b may correspond to an entire area or a portion thereof of the remaining media to the right side of the respective vertical edge 36a. Alternatively, the first predetermined area 37a may correspond to an area to the left side of the respective vertical edge 36a and to the right side of an adjacent image on the media, while the second predetermined area 37b may correspond to an area to the right side of the respective vertical edge 36a and to the left side of the adjacent image.

Referring to FIGS. 2-4C, in some examples, the categorization module 12 categorizes respective vertical edges 36a as left vertical edges in response to a determination that the lightness of color of the first predetermined area 37a is less than the lightness of color of the second predetermined area 37b. The categorization module 12 also categorizes respective vertical edges as right vertical edges in response to a determination that the lightness of color of the first predetermined area is greater than the lightness of color of the second predetermined area. The categorization module 12 also categorizes respective vertical edges as neutral vertical edges in response to a determination that the lightness of color of the first predetermined area is substantially equal to the lightness of color of the second predetermined area. For example, the categorization module 12 may communicate with the determination module 11 and the prioritization module 14.

Referring to FIGS. 2-4C, in some examples, the prioritization module 14 may prioritize the left vertical edges 46a to be printed by the printhead 15 with a printhead carriage 13 moving in the forward scanning direction $d_f$. The prioritization module 14 may also prioritize the right vertical edges 46b to be printed by the printhead 15 with the printhead carriage 13 moving in the reverse scanning direction $d_r$. For example, the prioritization module 14 may communicate with the categorization module 12 and the printhead 15 and/or printhead carriage 13. In some examples, the prioritization module 14 may prioritize the respective vertical edges 46a and 46b to be printed by associating a respective flag to the corresponding ink drops that will form the respective vertical edges 46a and 46b. For example, the respective flags may be indicative of whether the corresponding ink drops get printed with the printhead carriage 13 moving in the forward scanning direction $d_f$ or the reverse scanning direction $d_r$. Respective ink drops form the respective vertical edges 46a and 46b.

In some examples, the edge identification module 10, the determination module 11, the categorization module 12, and/or the prioritization module 14 may be combined into fewer modules such as one module or may be implemented as several modules. The edge identification module 10, the determination module 11, the categorization module 12, and/or the prioritization module 14 may be implemented in hardware, software including firmware, or combinations thereof. The firmware, for example, may be stored in memory and executed by a suitable instruction-execution system.

If implemented in hardware, as in an alternative example, the edge identification module 10, the determination module 11, the categorization module 12, and/or the prioritization module 14 may be implemented with any or a combination of technologies which are well known in the art (for example, discrete-logic circuits, application-specific integrated circuits (ASICs), programmable-gate arrays (PGAs), field-programmable gate arrays (FPGAs)), and/or other later developed technologies. In other examples, the edge identification module 10, the determination module 11, the categorization module 12, and/or the prioritization module 14 may be implemented in a combination of software and data executed and stored under the control of a computing device.

In some examples, the printhead 15 prints the left vertical edges 46a as part of a printed image 46 with the printhead carriage 13 moving in the forward scanning direction $d_f$. The printhead 15 also prints the right vertical edges 46b as part of the printed image 46 with the printhead carriage 13 moving in the reverse scanning direction $d_r$. Further, the printhead 15 prints the neutral vertical edges in the forward scanning direction $d_f$ or the reverse scanning direction $d_r$. In some examples, neutral vertical edges may not influence the print direction of the ink drops that make up the neutral vertical edges. In some examples, ink drops 48a and satellite drops 48b within an image region form the printed image 46.

Figure 5:
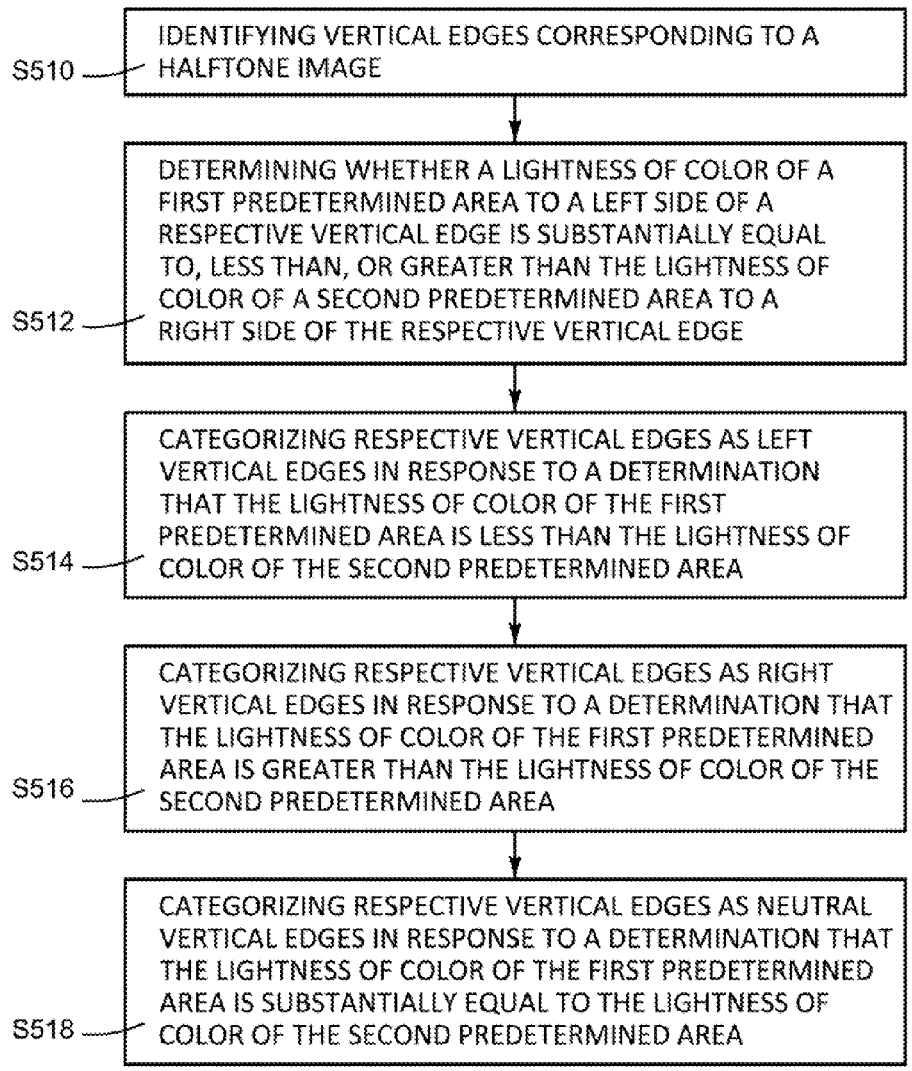
FIG. 5 is a flowchart illustrating a method of printing according to an example.

FIG. 5 is a flowchart illustrating a method of printing according to an example. Referring to FIG. 5, in block S510, vertical edges corresponding to a halftone image are identified. In some examples, identifying vertical edges corresponding to a halftone image may include identifying the vertical edges corresponding to the halftone image in a memory based on image data. For example, an edge identification module may identify the vertical edges. In block S512, whether a lightness of color of a first predetermined area to a left side of a respective vertical edge is substantially equal to, less than, or greater than the lightness of color of a second predetermined area to a right side of the respective vertical edge is determined, for example, by a determination module.

In some examples, whether a lightness of color of a first predetermined area is substantially equal to, less than, or greater than the lightness of color of a second predetermined area may depend on whether a difference between the lightness of color of the first predetermined area and the lightness of color of the second predetermined area is greater than or less than a threshold lightness difference. For example, the threshold lightness difference may be 100, for example, in a scale from 0 to 255 such that a white of the media may correspond to 0 and a black may correspond to 255 along the L* axis of the L*a*b* color space. In other examples, a different lightness threshold may be used as well as other ways of differentiating between tones.

In block S514, respective vertical edges are categorized as left vertical edges in response to a determination that the lightness of color of the first predetermined area is less than the lightness of color of the second predetermined area, for example, by a categorization module. In block S516, respective vertical edges are categorized as right vertical edges in response to a determination that the lightness of color of the first predetermined area is greater than the lightness of color of the second predetermined area, for example, by the categorization module. In block S518, respective vertical edges are categorized as neutral vertical edges in response to a determination that the lightness of color of the first predetermined area is substantially equal to the lightness of color of the second predetermined area, for example, by the categorization module.

In some examples, the method may also include prioritizing the left vertical edges to be printed by a printhead with a printhead carriage moving in a forward scanning direction, prioritizing the right vertical edges to be printed by the printhead with the printhead carriage moving in a reverse scanning direction, and enabling the neutral vertical edges to be printed by the printhead with the printhead carriage moving in the forward scanning direction or the reverse scanning direction. The prioritization of the respective vertical edges may be performed by a prioritization module. The method may also include printing the left vertical edges as part of a printed image by the printhead with printhead carriage moving in the forward scanning direction and printing the right vertical edges as part of the printed image by the printhead with the printhead carriage moving in the reverse scanning direction.

Figure 6:
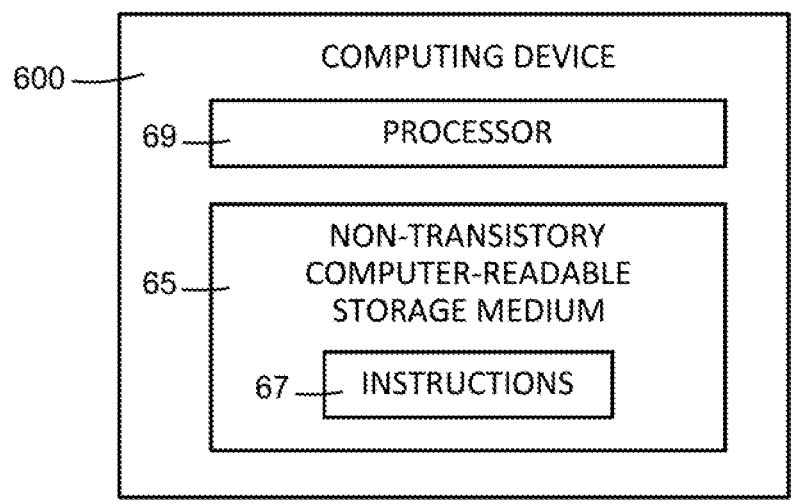
FIG. 6 is a block diagram illustrating a computing device such as a printing system including a processor and a non-transitory, computer-readable storage medium to store instructions to operate the printing system according to an example.

FIG. 6 is a block diagram illustrating a computing device such as a printing system including a processor and a non-transitory, computer-readable storage medium to store instructions to operate the printing system according to an example. Referring to FIG. 6, in some examples, the non-transitory, computer-readable storage medium 65 may be included in a computing device 600 such a printing system. In some examples, the non-transitory, computer-readable storage medium 65 may be implemented in whole or in part as instructions 67 such as computer-implemented instructions stored in the computing device locally or remotely, for example, in a server or a host computing device considered herein to be part of the printing system.

Referring to FIG. 6, in some examples, the non-transitory, computer-readable storage medium 65 may correspond to a storage device that stores instructions 67, such as computer-implemented instructions and/or programming code, and the like. For example, the non-transitory, computer-readable storage medium 65 may include a non-volatile memory, a volatile memory, and/or a storage device. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM).

Referring to FIG. 6, examples of storage devices include, but are not limited to, hard disk drives, compact disc drives, digital versatile disc drives, optical drives, and flash memory devices. In some examples, the non-transitory, computer-readable storage medium 65 may even be paper or another suitable medium upon which the instructions 67 are printed, as the instructions 67 can be electronically captured, via, for instance, optical scanning of the paper or other medium, then compiled, interpreted or otherwise processed in a single manner, if necessary, and then stored therein. A processor 69 generally retrieves and executes the instructions 67 stored in the non-transitory, computer-readable storage medium 65, for example, to operate a computing device 600 such the printing system. In an example, the non-transitory, computer-readable storage medium 65 can be accessed by the processor 69.

It is to be understood that the flowchart of FIG. 5 illustrates architecture, functionality, and/or operation of examples of the present disclosure. If embodied in software, each block may represent a module, segment, or portion of code that includes one or more executable instructions to implement the specified logical function(s). If embodied in hardware, each block may represent a circuit or a number of interconnected circuits to implement the specified logical function(s). Although the flowchart of FIG. 5 illustrates a specific order of execution, the order of execution may differ from that which is depicted. For example, the order of execution of two or more blocks may be rearranged relative to the order illustrated. Also, two or more blocks illustrated in succession in FIG. 5 may be executed concurrently or with partial concurrence. All such variations are within the scope of the present disclosure.

The present disclosure has been described using non-limiting detailed descriptions of examples thereof that are not intended to limit the scope of the general inventive concept. It should be understood that features and/or operations described with respect to one example may be used with other examples and that not all examples have all of the features and/or operations illustrated in a particular figure or described with respect to one of the examples. Variations of examples described will occur to persons of the art. Furthermore, the terms "comprise," "include," "have" and their conjugates, shall mean, when used in the disclosure and/or claims, "including but not necessarily limited to."

It is noted that some of the above described examples may include structure, acts or details of structures and acts that may not be essential to the general inventive concept and which are described for illustrative purposes. Structure and acts described herein are replaceable by equivalents, which perform the same function, even if the structure or acts are different, as known in the art. Therefore, the scope of the general inventive concept is limited only by the elements and limitations as used in the claims.

What is claimed is:

1. A method comprising:
    identifying, by a printing device, vertical edges corresponding to a halftone image;
    determining whether a lightness of color of a first predetermined area to a left side of a respective vertical edge is substantially equal to, less than, or greater than the lightness of color of a second predetermined area to a right side of the respective vertical edge;
    categorizing, by the printing device:
        respective vertical edges as left vertical edges in response to a determination that the lightness of color of the first predetermined area is less than the lightness of color of the second predetermined area;
        respective vertical edges as right vertical edges in response to a determination that the lightness of color of the first predetermined area is greater than the lightness of color of the second predetermined area;
        respective vertical edges as neutral vertical edges in response to a determination that the lightness of color of the first predetermined area is substantially equal to the lightness of color of the second predetermined area; and
    printing, by a printhead of the printing device, the left vertical edges while a printhead carriage of the printing device on which the printhead is disposed is moving in a forward scanning direction, and the right vertical edges while by the printhead carriage is moving in a reverse scanning direction.

2. The method of claim 1, further comprising:
    printing, by the printhead of the printing device, the neutral vertical edges regardless of whether the printhead carriage is moving in the forward scanning direction or the reverse scanning direction.

3. The method of claim 1, wherein the identifying vertical edges corresponding to a halftone image comprises:
    identifying the vertical edges corresponding to the halftone image in a memory based on image data.

4. The method of claim 1, wherein the determining of whether a lightness of color of a first predetermined area is substantially equal to, less than, or greater than the lightness of color of a second predetermined area further comprises:
    whether a difference between the lightness of color of the first predetermined area and the lightness of color of the second predetermined area is greater than or less than a threshold lightness difference.

5. The method of claim 4, wherein the threshold lightness difference is 100 on a scale of 0 to 255 such that 0 corresponds to a whiteness of the un-printed media and 255 corresponds to a black.

6. A printing system, comprising:
    a printhead carriage movable in a forward scanning direction and a reverse scanning direction;
    a printhead disposed on the printhead carriage;
    a processor; and
    a non-transitory computer-readable data storage medium storing instructions executable by the processor to:
        identify vertical edges corresponding to a halftone image;
        determine whether a lightness of color of a first predetermined area to a left side of a respective vertical edge is substantially equal to, less than, or greater than the lightness of color of a second predetermined area to a right side of the respective vertical edge;
        categorize respective vertical edges as left vertical edges in response to a determination that the lightness of color of the first predetermined area is less than the lightness of color of the second predetermined area, to categorize respective vertical edges as right vertical edges in response to a determination that the lightness of color of the first predetermined area is greater than the lightness of color of the second predetermined area, and to categorize respective vertical edges as neutral vertical edges in response to a determination that the lightness of color of the first predetermined area is substantially equal to the lightness of color of the second predetermined area;

cause the printhead to print the left vertical edges while the printhead carriage is moving in a forward scanning direction, and the right vertical edges while the printhead carriage is moving in a reverse scanning direction.

7. The printing system of claim 6, wherein the vertical edges corresponding to the halftone image are identified by the edge identification module in memory based on image data.

8. The printing system of claim 6, wherein the categorization module determines whether the lightness of color of the first predetermined area is substantially equal to, less than, or greater than the lightness of color of the second predetermined area by determining whether a difference between the lightness of color of the first predetermined area and the lightness of color of the second predetermined area is greater than or less than a threshold lightness difference in which the threshold lightness difference is a number on a scale of 0 to 255 such that 0 corresponds to a whiteness of the un-printed media and 255 corresponds to a black.

9. A non-transitory computer-readable storage medium having computer executable instructions stored thereon that are executable by a printing device to:

identify vertical edges corresponding to a halftone image;

determine whether a lightness of color of a first predetermined area to a left side of a respective vertical edge is substantially equal to, less than, or greater than the lightness of color of a second predetermined area to a right side of the respective vertical edge of;

categorize respective vertical edges as left vertical edges in response to a determination that the lightness of color of the first predetermined area is less than the lightness of color of the second predetermined area of;

categorize respective vertical edges as right vertical edges in response to a determination that the lightness of color of the first predetermined area is greater than the lightness of color of the second predetermined area of;

categorize respective vertical edges as neutral vertical edges in response to a determination that the lightness of color of the first predetermined area is substantially equal to the lightness of color of the second predetermined area of;

prioritize the left vertical edges to be printed by a printhead with a printhead carriage moving in a forward scanning direction;

prioritize the right vertical edges to be printed by the printhead with the printhead carriage moving in a reverse scanning direction; and cause a printhead of the printing device to print the left vertical edges and the right vertical edges as have been prioritized.

10. The non-transitory computer-readable storage medium of claim 9, wherein the instructions are further executable by the printing device to cause the printhead to print the neutral vertical edges regardless of whether the printhead carriage is moving in the forward scanning direction or in the reverse scanning direction.

11. The non-transitory computer-readable storage medium of claim 9, wherein the instructions are executable by the printing device to determine whether the lightness of color of the first predetermined area is substantially equal to, less than, or greater than the lightness of color of the second predetermined area by determining whether a difference between the lightness of color of the first predetermined area and the lightness of color of the second predetermined area is greater than or less than a threshold lightness difference in which the threshold lightness difference is a number on a scale of 0 to 255 such that 0 corresponds to a whiteness of the un-printed media and 255 corresponds to a black.

* * * * *